Figure 4:
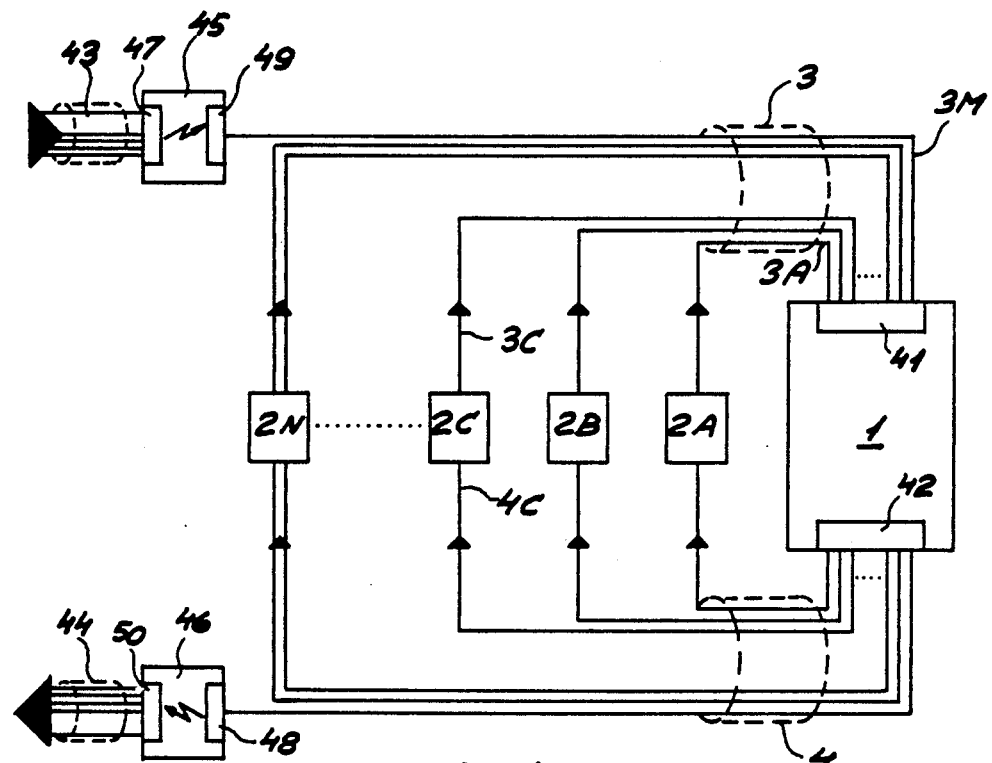

United States Patent [19]

Smitt

[11] Patent Number: 4,532,627
[45] Date of Patent: Jul. 30, 1985

[54] TIME MULTIPLEX CONTROLLED DATA SYSTEM

[75] Inventor: Asbjorn Smitt, Vedbaek, Denmark

[73] Assignee: Christian Rovsing A/S, Ballerup, Denmark

[21] Appl. No.: 467,903

[22] Filed: Feb. 18, 1983

Related U.S. Application Data

[63] Continuation of Ser. No. 193,530, filed as PCT DK 79/00041, published as WO 80/00883, May 1, 1980, § 102(e) date Jun. 27, 1980, abandoned.

[30] Foreign Application Priority Data

Oct. 27, 1978 [DK] Denmark ............................. 4792/78
Nov. 30, 1978 [DK] Denmark ............................. 5396/79

[51] Int. Cl.³ ............................. H04J 3/16; H04J 6/00
[52] U.S. Cl. ......................................... 370/85; 370/92; 370/94; 370/95; 455/612
[58] Field of Search ....................... 370/79, 85, 89, 92, 370/93, 94, 95; 455/612

[56] References Cited
U.S. PATENT DOCUMENTS 3,851,104 11/1974 Willard et al. ...................... 370/85

OTHER PUBLICATIONS

Campbell-Multiterminal Data Distribution-SPIE vol. 139, Guided Wave Optical Systems and Devices, Mar. 1978, pp. 8-11.

Primary Examiner—Joseph A. Orsino, Jr.

[57] ABSTRACT

A time multiplex controlled data system containing a plurality of data processing units (2A, 2B ... 2N) which are connected to a time control unit (1) containing a multiplex table (7). Normally, the data processing units have both a transmitter and a receiver, and the system is so designed that several transmitters are connected to a common, passive bus (3) arranged to carry information only in a direction towards the time control unit (1), while several receivers are connected to a second, passive bus (4) arranged to carry information from the control unit (b 1) only in a direction towards the data processing units and so that any communication between the data processing units takes place via the time control unit (1).

5 Claims, 5 Drawing Figures

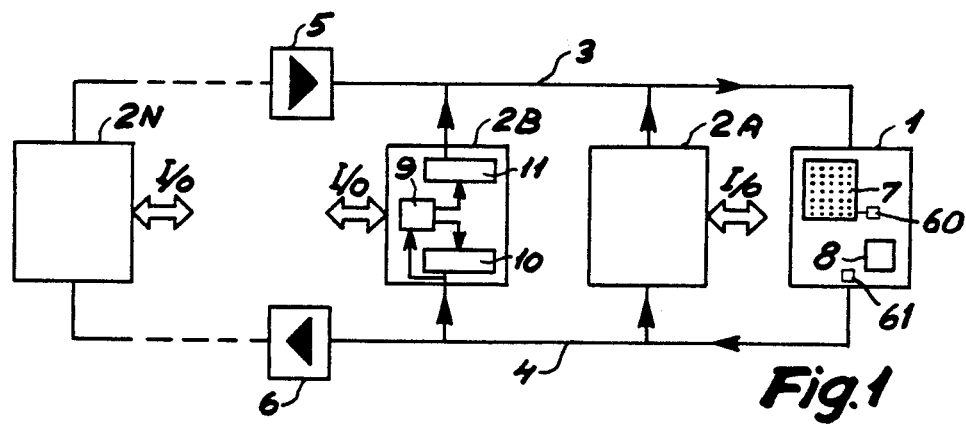
Fig.1
Fig.2A
Fig.2B
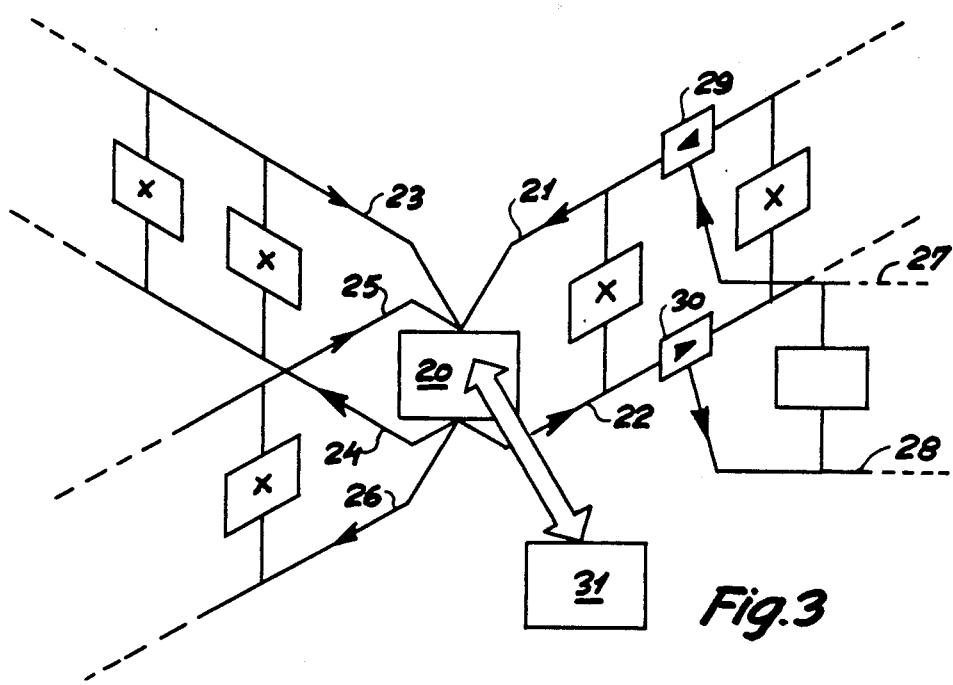
Fig.3

TIME MULTIPLEX CONTROLLED DATA SYSTEM

This is a continuation of application Ser. No. 193,530 filed as PCT DK 79/00041, published as WO 80/00883, May 1, 1980, § 102(e) date June 27, 1980 now abandoned.

The invention relates to a data system having a plurality of time multiplex controlled data processing units connected to a control unit for receiving time multiplex instructions contained in a multiplex table in the control unit. In particular, the invention relates to such data systems as have a large number of data processing units or so-called peripheral units, such as display units, printers, card readers, modem-equipment for data transmission and the like.

In known systems the peripheral units have heretofore been connected to one or more data buses for multidirectional transmission of data. To control the data transmission each peripheral unit has had associated control devices for controlling the transmitting and receiving operations so as to obviate collision between several flows of data. It is universally known to time multiplex control the periphral units, but due to the structure of the system just described it has till now been impossible to achieve an effective allocation of time slots to the individual units. The known control and multiplex division are particularly difficult to make operate satisfactorily when a large number of peripheral units are to communicate with each other via long cable connections.

An example of the difficulties mentioned above can be found in the U.S. Pat. No. 3,706,853 which tries to simplify the bus connections to a large number of peripheral units. This known art comprises active bus lines connecting the peripheral units in a cascade coupling. By an active bus line is understood that when passing each peripheral unit the bus will be interrupted by active circuit elements, and it will therefore be appreciated that the system ceases to operate if just one of the many circuit elements fails.

The object of the invention is to provide a system of a rationally operating structure which is cheap to construct and which is particularly suitable where a large number of peripheral units are relatively widely dispersed from one another.

This objection is achieved in that the system comprises a single first passive bus for transferring data to the control unit only in the direction from a unit connected to the bus, and single second passive bus for transferring data blocks only in the direction from the control unit to the units connected to the bus, said data blocks constitute the mutual communication between the units and containing information from the multiplex table and said data. Thus, the invention is unique in that all the information to be exchanged between the peripheral units mutually passes through the control unit via buses where the data are only transmitted in one direction. When the unit is connected to the buses in this manner the physical location of the units may be randomly changed along the buses, which may be very long and/or comprise delta connected branches, it being inexpensive to insert simple amplifiers in the bus because data are only transmitted in one direction. Thus, the long buses only involve an inevitable time delay due to the signal rate, but since all the information passes the control unit and is combined with information about the multiplex control, the peripheral units may be controlled quickly and reliably, as will appear from the following description.

Preferably, said buses are designed for series transmission, because this makes it possible to obtain a sufficient transmission rate for most uses. Each bus may e.g. comprise a screen conductor and two twisted inner conductors which can transfer a differential signal, and it will therefore be relatively inexpensive to provide such cables in e.g. a building, and to mount junction boxes for the peripheral units at suitable locations.

It is particularly expedient to employ optical cables in the system of the invention since the data are only transmitted in a specific direction on said buses. When installing the system of the invention a first and a second bus in the form of two optical cables may be provided e.g. in the various rooms in a building, and when a peripheral unit is to be connected it is simply coupled to a spare optical fibre, partly from the first bus cable and partly from the second bus cable. In relation to a conventional bus the system of the invention obviates any risk of signal reflections and attenuation caused by the connection of data processing units along the buses.

The control unit is designed to modify the contents of the multiplex table in response to said data. This permits an optimum time multiplex control of the system because a peripheral unit can produce changes in the time multiplex table such that the unit concerned is allocated more or fewer time slots relative to the other units.

When the data transmission on the second bus of said connections takes place only in the direction from the control unit to the connected units, timing pulse signals can be continuously sent out from the control unit to the connected peripheral units for controlling the transmitter and receiver operations of the peripheral units. This makes it possible to prevent information to be transmitted at the same time several peripheral units to the first bus to the connection, and it also minimizes the intervals between transmissions of information from various peripheral units.

As the signal time delay in the cables necessitates a certain safety distance between the data-blocks transmitted, the time control of the system will lay down a predetermined, maximum length of bus. The number of the peripheral units may, however, be increased considerably because the control unit may have connected thereto data connections which each consist of a first and a second bus with associated peripheral units. The number of such connections might be controlled by a supreme time multiplex system. However, they are preferably connected in that the control to the control unit and a data output common to all the buses carrying information from the control unit. This gives a branch structure which is possible thanks to the unidirectional transmission through the buses.

The control unit contains delay means designed to delay said data a predetermined period of time, preferably a time slot, before data are retransmitted to the units. This reduces significantly the safety distance mentioned above because the time delay in the control unit means that the information received can be resynchronized before it is retransmitted.

The invention will be explained in more detail in the following description of some embodiments with reference to the drawing, in which FIG. 1 shows an embodiment of the system of the invention, where a plurality of peripheral units are connected directly to a control unit via two unidirectional buses, FIGS. 2A and 2B show in principle an example of the format of a data block on the upper and lower buses, respectively of FIG. 1, FIG. 3 shows another embodiment of the system of the invention where the control unit is partly connected to three pairs of buses with associated peripheral units and is partly arranged to communicate with an external data system, and FIG. 4 shows a system corresponding to that of FIG. 1, but with optical cables as buses.

FIG. 1 shows a control unit 1 which is connected to a plurality of peripheral units 2A, 2B, 2N, where N may e.g. be 256, via two buses 3 and 4, respectively. According to the invention data are transmitted on the buses 3 and 4 only in one direction, indicated by arrows, so that any information which is to exchanged between the peripheral units 2 passes through the control unit 1. As indicated by arrows I/O the peripheral units have data connections, e.g. for receiving information from a keyboard and for transmitting information to a display. Owing to the attenuation of signals along the buses amplifiers may be inserted at suitable intervals, as indicated by 5 and 6. These amplifiers are very simple because signals are only transmitted one way through the respective amplifier.

As shown in the figure the control unit 1 comprises a store 7, which is designed to contain multiplex information. The store 7 may e.g. be so designed that each of its store cells contains the number of a peripheral unit so that cyclic scanning, by cyclic scanning means 60, of the store will give the order in which the peripheral units are allowed to transmit information on the bus 3. According to the invention the information on the bus 3, e.g. in the form of a data block shown in FIG. 2A per time slot, passes through the control unit 1 from which information, e.g. in the form of the data block shown in FIG. 2B, is transmitted on the bus 4. The data block shown in FIG. 2A comprises a flag F, control data SD and data D proper and may also contain not shown data e.g. for debugging. The data block of FIG. 2B differs from the data block of FIG. 2A in that it has multiplex information MUL from the store 7, said information determining the number of the peripheral unit that is allowed to transmit the next data block (FIG. 2A) on the bus 3. According to the invention the control unit 1 is so arranged that in response to the information in the data block (FIG. 2A) it can modify the contents of the store 7 so that a peripheral unit, which e.g. is to transmit a large volume of information, can allocate to itself a larger fraction of a multiplex cycle as the data block 2A may contain information to the effect that the number of the unit concerned is to be introduced several times into the store 7. When the unit has transmitted its information it may again order that its number appears e.g. only once in the store 7.

It is observed that the data formats shown in FIGS. 2A and 2B are only to be considered a preferred example, it being possible to place the information MUL at other locations in the data block, optionally completely outside it.

The unidirectional transmission according to the invention has another advantage because timing pulses may continuously be transmitted to the peripheral units from a timing pulse generator 8 in the control unit 1. The timing pulses may be transferred by using a timing pulse generating code for the transfer of information, such as the code SPL/D (differential split phase) with the polarity changing at the start of each bit and also midway in such bits as are logic 0. Each of the peripherical units contains a circuit 9 for regenerating the timing pulses used for controlling data receipt for the bus 4 and data transmission on the bus 3, as is schematically indicated by the shift registers 10 and 11, respectively.

The most important advantage of this is that the time delay caused by the long buses does not prevent a correct decoding of the data signals because the data signals and the timing pulse information are delayed equally much. Moreover, the moments of transmission on the bus 3 are automatically synchronized. Transmission of information on the bus 3 may e.g. be initiated by recognition of a characteristic bit pattern between the data blocks of FIG. 2B on the bus 4. The central generation of the timing pulses also solves the well-known phase fault problem in modem-equipment.

If the information on the bus 3 passed directly through the control unit 1 in continuation of the multiplex information it will be appreciated that e.g. there had to be a safety distance between the data blocks corresponding to the delay caused by the total length of the buses when the unit 2N transmits information i.a. to itself. This safety distance can be reduced, however, so as to correspond only to the delay caused by the length of the bus 3 resynchronizing the information in the control unit 1. For the information to be resynchronized it must be delayed, by delay means 61, a predetermined period which may advantageously be a time slot, which furthermore allows more extensive data control in the control unit 1.

It will then be appreciated that a very reliable and rational control can be achieved by means of the system of the invention which is very inexpensive to install, it being only necessary to provide two of the buses described in e.g. the rooms of a building in which plugs are mounted for connecting the peripheral units. The peripheral units may be moved about without any restrictions and be connected at an arbitrary location along the buses without any changes in the installation or the control programmes.

As previously mentioned, a maximum length of the buses are normally determined when the system is designed so as to avoid too long dead time caused by delays in the propagation of signals, and in very large systems the other embodiment shown in FIG. 3 of the system of the invention may therefore be used. In this embodiment a control unit 20 is arranged to receive information via three buses 21, 23 and 25 and to transmit information on three buses 22, 24 and 26, respectively. According to the invention said three buses are all designed to carry information only in the directions indicated by the arrows in the figure. The buses are thus connected to respective sets of peripheral units, as will be seen in the figure, and the units may operate in the same manner as described in the foregoing in connection with FIG. 1. Owing to the installation of the buses it may be expedient to have one or more branches, and FIG. 3 shows a branch 27, 28 from the buses 21, 22 where amplifiers 29 and 30 may optionally be inserted in the branch points. Like ordinary line amplifiers (5, 6 in FIG. 1) these amplifiers are very simple and cheap as information is always transmitted in a predetermined direction.

As it may occur that the one of the peripheral units X which has been allocated a time slot has no information to transmit, the control unit 20 (or the control unit 1 in FIG. 1) is arranged to recognize this and to produce itself a data block on the buses 22, 24 and 26, (or the bus in FIG. 1). This data block preferably contains information only from the multiplex table in the control unit so that information is transmitted, telling which of the peripheral units is to transmit the next time via the buses 21, 23 or 25. In such a case where a selected peripheral unit has no information to transmit the control unit 20 may receive information from an external data system 31. Similarly, the control unit may be arranged to receive information from the external data system 31 and to transmit this information together with data from the multiplex table on the buses 22, 24 and 26 in time slots where no information is to be transmitted from the buses 21, 23 and 25. In a system of the type described it is according to the invention particularly expedient to use optical cables each containing a plurality of optical fibres, as buses. FIG. 4 shows an embodiment corresponding to that of FIG. 1(partly the same reference numerals), using optical cables. The fibres of the cable 3 are called 3A—3M, M being greater than N, and the same holds for the optical cable 4.

When the system is to be installed cables 3 and 4 ( or optionally several pairs of cables associated with the control unit (1) are provided e.g. in the rooms of a building where the data processing units are to be or might conceivably be mounted. When a data processing unit, e.g. the unit 2C, is to be coupled to the data system, a spare optical fibre from the cable 3 and a spare optical fibre 4C from the cable 4 are connected to the input and output, respectively, of the unit. This obviates the need for sockets which might cause reflections on the buses, but above all the optical cables are an advantage because the system is so designed that only a single unit at the time transmits on the bus and only in one direction so that the optical cables may be connected to a common transmitter and receiver, respectively, in the control unit 1. The control unit 1 contains a single optical receiver 41 to which all the fibres of the cables 3 are coupled and the information on the cable 4 is transmitted through all its fibres by means of a single, optical transmitter 42. As has previously been explained, several pairs of buses may be connected to the control unit 1, and according to the circumstances optical cables or conventional lines may be used.

When many, e.g. several hundred data processing units are to be connected to the control unit 1, it may be relatively expensive to provide correspondingly thick optical cables over large distances. This may be obviated by means of very simple line amplifiers which are shown in the figure by 45 and 46. Due to the same circumstances as were explained in connection with the receiver and transmitter 41 and 42, respectively, each amplifier contains only a single optical receiver and a single optical transmitter. The amplifier 45 has thus an optical receiver 47 which is common to all the optical fibres in the cable 43 and contains an optical transmitter 49 which need only be connected to a single optical fibre in the cable 3. Similarly, the amplifier 46 has an optical receiver 48 and an optical transmitter 50, the latter transmitting information on an optical cable 44. Amplifiers in the cable carrying information from the control unit 1 may thus advantageously be arranged to transmit information on many optical fibres at the same time and to receive information from only a single or few fibres, while amplifiers in the cable carrying information to the control unit 1 are arranged to transmit on a single or few fibres and to receive from many fibres.

The optical fibres have also the advantage that in response to attenuation i.e. depending upon the distance from a data processing unit to the optical transmitter or receiver, two or more optical fibres may be taken from each bus and connected to the output and input, respectively, of the data processing unit, as is shown for the unit 2N. The locations of the amplifiers are therefore not predetermined by the signal attenuation; they may be placed depending upon the need for optical fibres, making it possible to carry out the installation very rationally.

I claim:

1. A time multiplex controlled data system comprising:
   a first and a second bus, said first bus carrying a first data block in a first direction, said first data block including control information (F,SD) and storage data (D), and said second bus carrying a second data block in a second direction, said second data block including device identification signals (MUL), said control information (F,SD), and said storage data (D);
   a control unit coupled between said first and second bus;
   a plurality of data processing units coupled between said first and second buses, each of said plurality of data processing units including:
     means for sensing said control information and said device identification signals (MUL) indicative of which one of said plurality of data processing units and said control unit is permitted to receive said storage data and which unit is to transmit next on said first bus; and,
     means for controlling the transmission of said first data block dependent upon the sensing of said device identification signals (MUL) and one of a plurality of timing pulses;
     means for transmitting said first data block synchronously with respect to said one of said plurality of timing pulses to said control unit in said first direction via said first bus; said control unit including:
   a pulse generator means for generating said plurality of timing pulses; a multiplex memory;
   a cyclic scanning means coupled to said multiplex memory for reading out multiplex information therefrom, said multiplex information representing said device identification signals (MUL);
   means for receiving said first data block received from said first bus and for introducing said device identification signals (MUL) into said first data block to obtain said second data block; and,
   transmission means for transmitting, to said data processing units in said second direction, said second data block via said second bus.

2. A system according to claim 1, wherein said multiplex memory consists of a plurality of entries and the address of one of said data processing units is stored in each said entry, a portion of said plurality of entries in said multiplex memory is assigned to each said data processing unit, and said control unit includes means for modifying said portion of said entries in response to the data received by said control unit over the first bus.

3. A system according to claim 1, wherein said timing pulses are continuously transferred to the second bus.

4. A system according to claim 1, wherein said control unit includes delay means for delaying said first data block by a predetermined period of time before said second data block including said multiplex information is transmitted to said data processing units.

5. A system according to claim 1, wherein said first and second buses comprise optical fiber cables, said control unit including an optical receiver common to the first bus and an optical transmitter common to the second bus, wherein the number of optical fibers connecting an optical fiber cable and a data processing unit increases with an increase in optical fiber length.

* * * * *

UNITED STATES PATENT AND TRADEMARK OFFICE
CERTIFICATE OF CORRECTION

PATENT NO.   :   4,532,627
DATED        :   Jul. 30, 1985
INVENTOR(S)  :   Asbjorn Smitt It is certified that error appears in the above-identified patent and that said Letters Patent is hereby corrected as shown below:

Title Page, Item [30], Foreign Application Priority Data:

"Denmark .......... 5396/79" should be

--Denmark .......... 5396/78 --.

Signed and Sealed this

Third Day of June 1986

[SEAL]

Attest:

Attesting Officer

DONALD J. QUIGG

Commissioner of Patents and Trademarks